Nov. 9, 1926.

1,606,046

J. P. SEAHOLM

POWER LIFT MECHANISM

Filed April 14, 1924     5 Sheets-Sheet 1

Inventor:
John P. Seaholm
by J. C. Shouts   Atty.

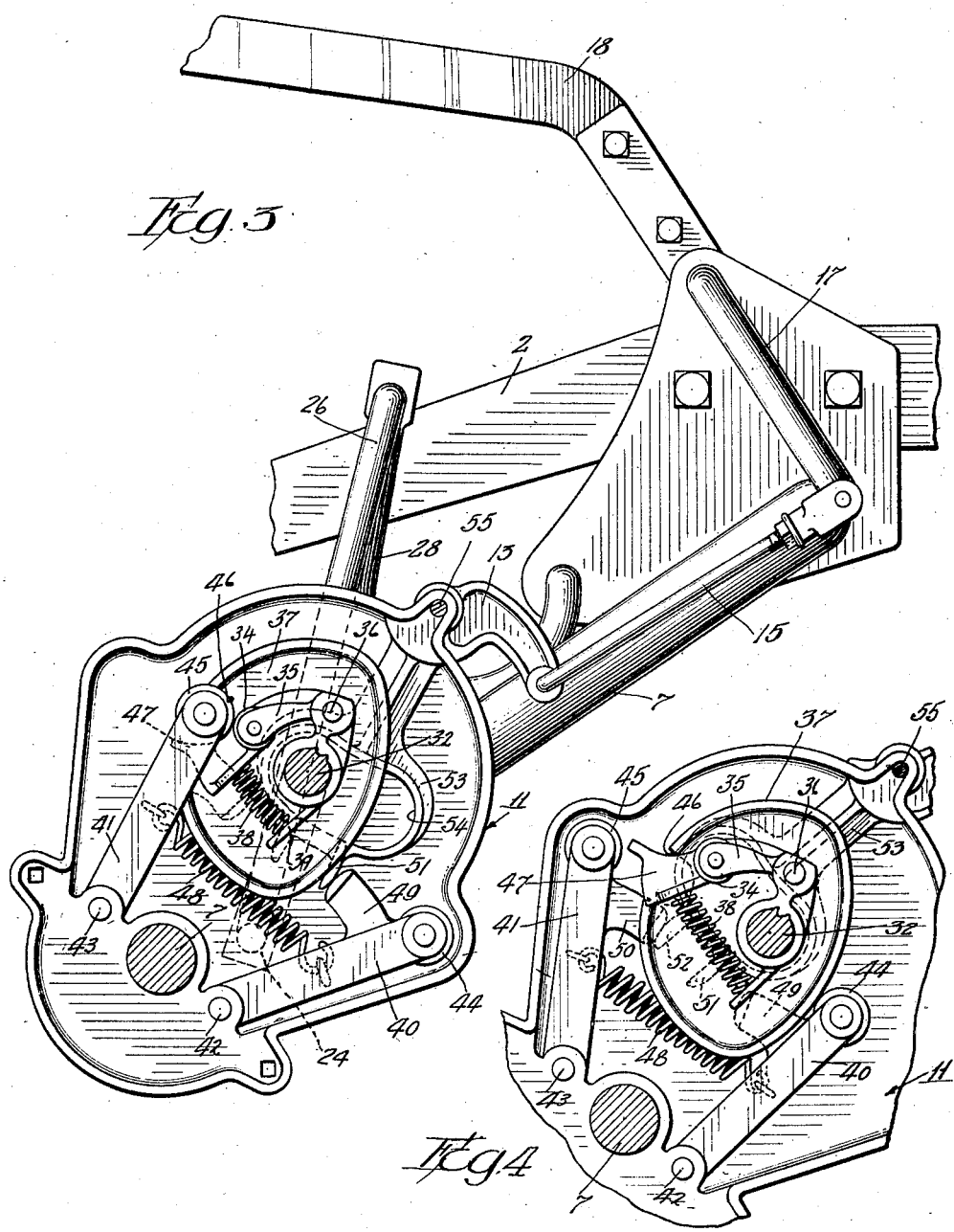

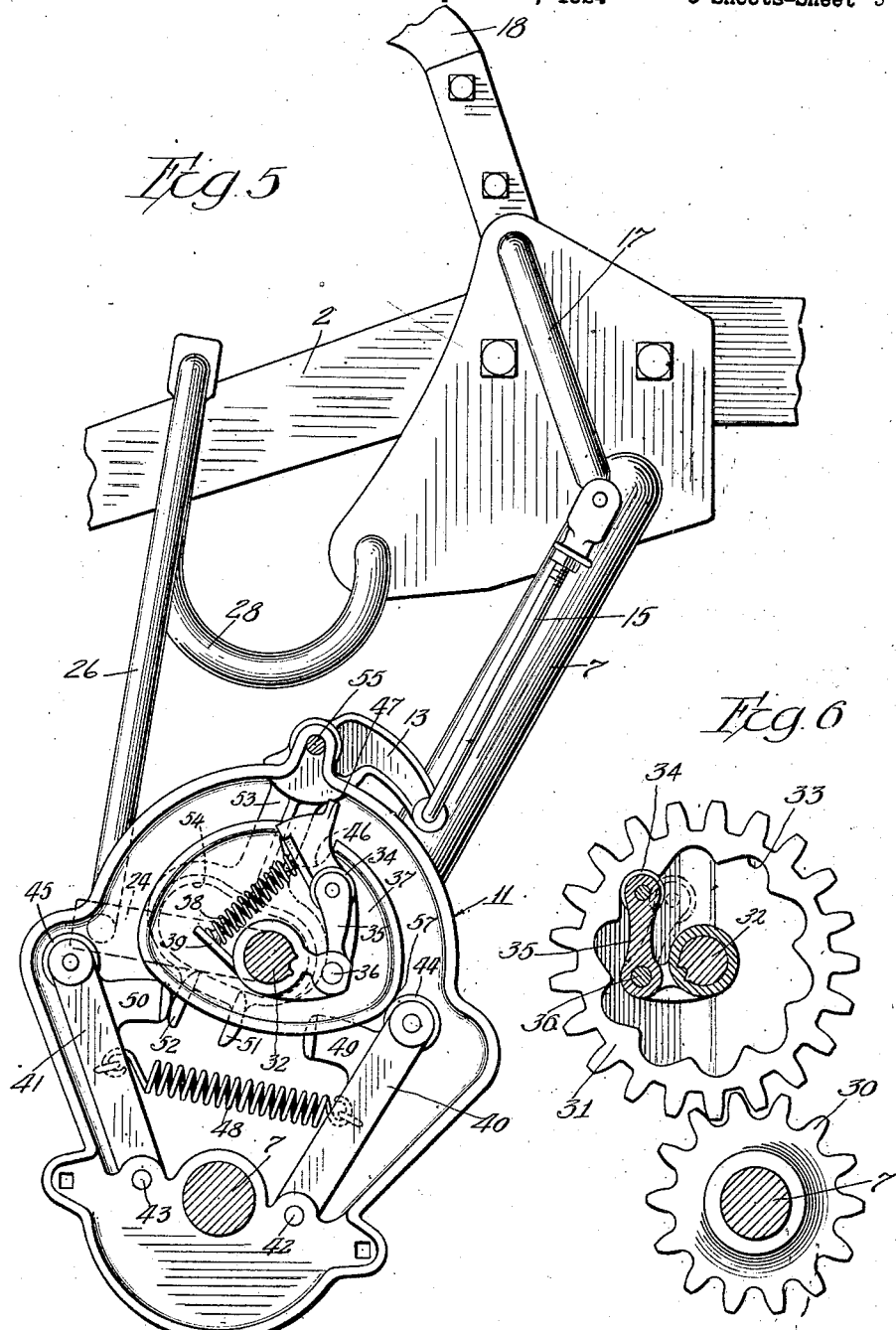

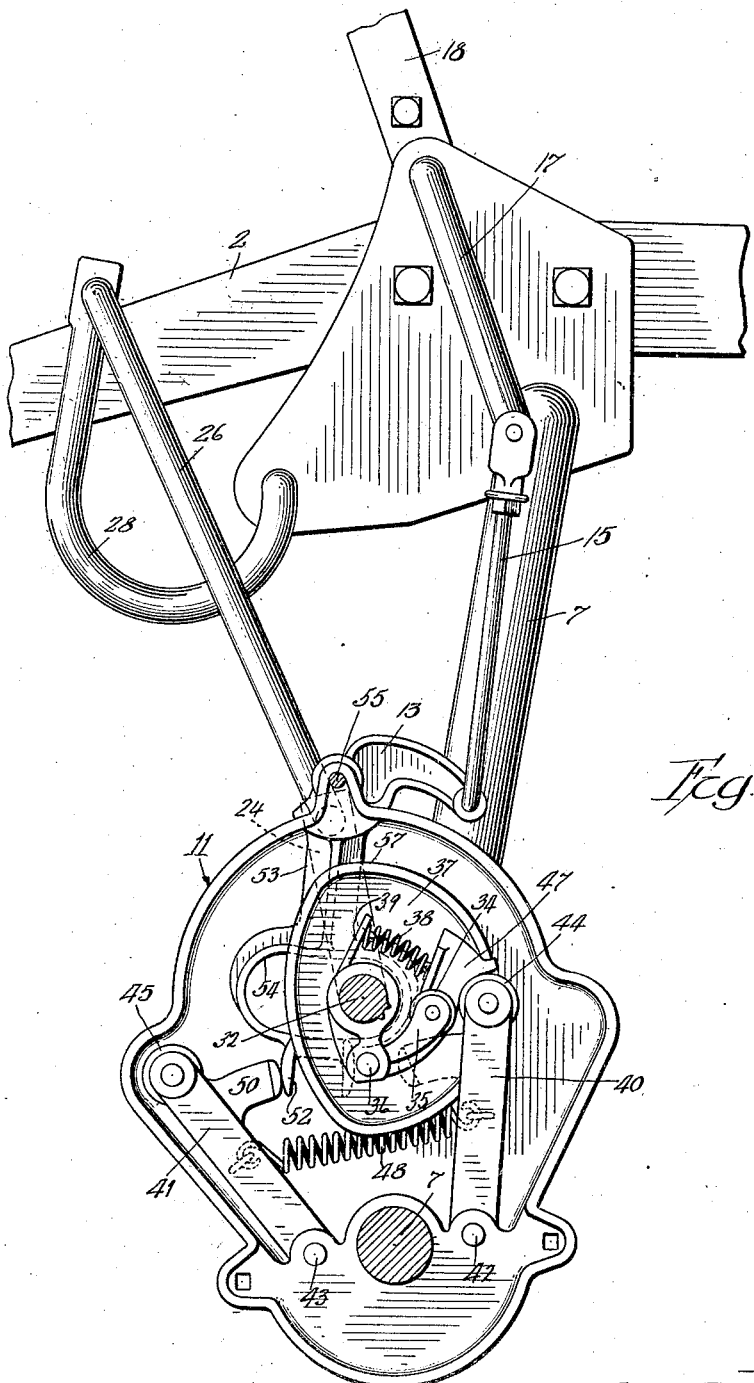

Patented Nov. 9, 1926.

1,606,046

UNITED STATES PATENT OFFICE.

JOHN P. SEAHOLM, OF MOLINE, ILLINOIS, ASSIGNOR, BY MESNE ASSIGNMENTS, TO MOLINE IMPLEMENT COMPANY, A CORPORATION OF ILLINOIS.

POWER-LIFT MECHANISM.

Application filed April 14, 1924. Serial No. 706,291.

The invention relates to a powerlift mechanism.

It relates particularly to an agricultural implement powerlift mechanism of the type used for swinging the crank axles to raise and lower the implement, and it is an improvement on the mechanism shown in the co-pending application of Otis W. Howard and Henry P. Corbin, Serial No. 644,795, filed June 11th, 1923.

The mechanism of said application is such that, when the tripping lever is operated, one of the locking latches is thrown out of locking engagement and another locking latch is placed under tension so that, after the mechanism has moved through a definite cycle, the latch will snap into locking position and stop the mechanism. The force required to move the tripping lever so as to place a tension on one of the locking latches is not great, and the mechanism of said application can be easily operated by an ordinarily careful operator, but sometimes a careless operator may let go of the lever as soon as it encounters the slight resistance required to place a tension on the locking latch, and will not move the lever the required extent. The present invention has been devised to place the necessary tension on the locking latches without requiring that the operator do it by movement of the tripping lever.

The general object of the invention is to provide an improved agricultural implement powerlift mechanism.

Another object is to provide an improved powerlift mechanism which places the locking latches of such mechanism under tension through the movement of the mechanism itself, so that, when the mechanism reaches a point where it is to be stopped, the locking latches will be positively snapped into locking position.

Other objects and advantages of the invention will hereinafter appear.

An embodiment of the invention is shown in the drawings in which,

Figure 3 is a side elevation and partial section of the powerlift mechanism showing it in the position it occupies when the implement is lowered.

Figure 4 is a view similar to Figure 3, illustrating the position of the parts after the tripping lever has been operated to start a raising movement of the mechanism.

Figure 5 is a side elevation and partial section showing the position of the parts after the raising movement has been started, this figure illustrating particularly how tension is placed on the locking latches.

Figure 6 is a side elevation and partial section of the driving gears of the powerlift viewed from the opposite side to that of Figure 5.

Figure 7 is a side elevation and partial section showing the parts in the position they occupy when the implement is raised.

Figure 1:
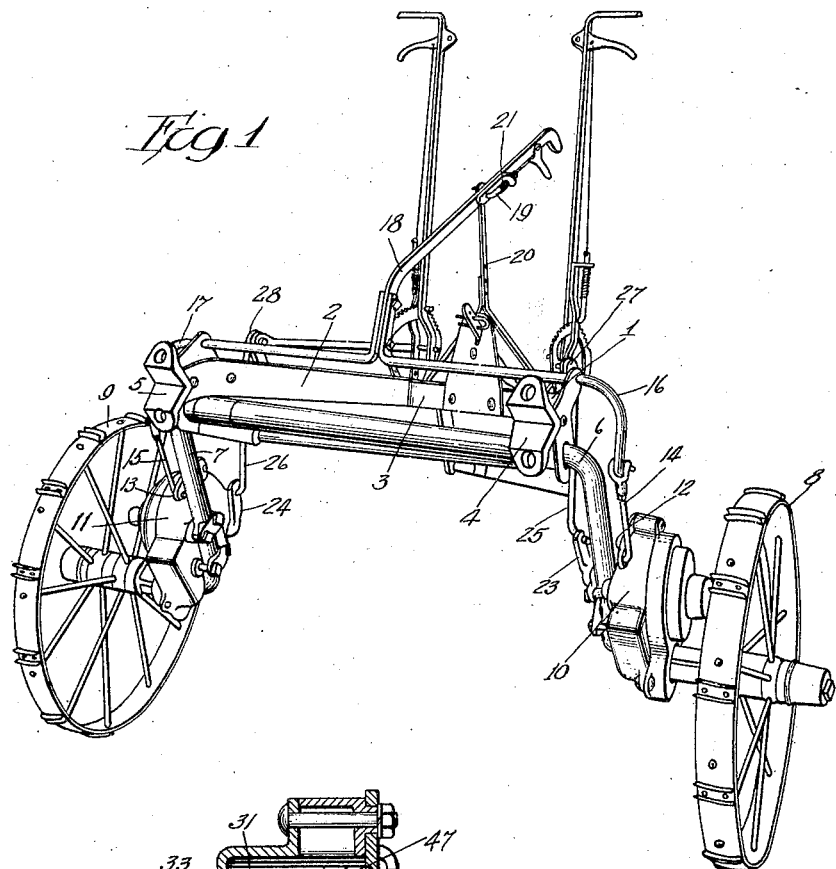
Figure 1 is a perspective view of a universal agricultural implement with the powerlift mechanism applied thereto.

The powerlift mechanism is illustrated in connection with a universal agricultural tool-carriage, but it will be understood that it can be used with any other suitable agricultural implement.

The universal tool-carriage includes draft bars 1 and 2, connected together by a cross brace 3. The bars have their rear ends shaped at 4 and 5 for the reception of a supporting bar or other connecting device forming a part of a tool unit which is detachably connected to the carriage. Pivoted to the draft bars are crank axles 6 and 7 carrying ground wheels 8 and 9. Supported on the crank axles are powerlift mechanisms 10 and 11, respectively, enclosed by housings which exclude dust and dirt and permit lubricants to be retained for oiling the parts.

The powerlift mechanisms have tripping levers 12 and 13, respectively, connected by links 14 and 15 to the cranked ends of shafts 16 and 17 which are attached to a control lever 18. The control lever has a latch 19 co-operating with notches in a locking bar 20. The locking bar is pivoted to the frame so as to give it a limited movement to accommodate the movement of the control lever 18 which moves through an arc. The latch 19 is biased by a spring 21 into engagement with the bar 20, so that the latch frictionally engages the bar and snaps into the notches in the bar when the control lever is moved to the proper position. It will be noted that the control lever is connected rigidly to the tripping levers of both powerlifts so that both mechanisms will be positively tripped into operation at the same time.

The powerlift mechanisms intermittently rotate cranks 23 and 24 connected by links 25 and 26, respectively, to links 27 and 28, which are pivoted in bearings on the draft bars 1 and 2. The cranks 23 and 24 are shown in Figure 1 in the position they occupy when the carriage is raised. When the powerlift mechanisms are moved through a cycle of movement from the position shown in Figure 1, the cranks are moved to a position approximately 180° from that illustrated. If it be assumed that the draft bars 1 and 2 remain staionary, it will be understood that this movement will swing the crank axles 6 and 7 upwardly and closer to the draft bars. The effect is to lower the machine because the ground wheels on the crank axles remain in contact with the ground and the draft bars move downwardly relative to the ground as the crank axles swing upwardly.

Both of the powerlift mechanisms are similar except one is right-handed and the other left-handed. A description of one will be sufficient for an understanding of both.

Figure 2:
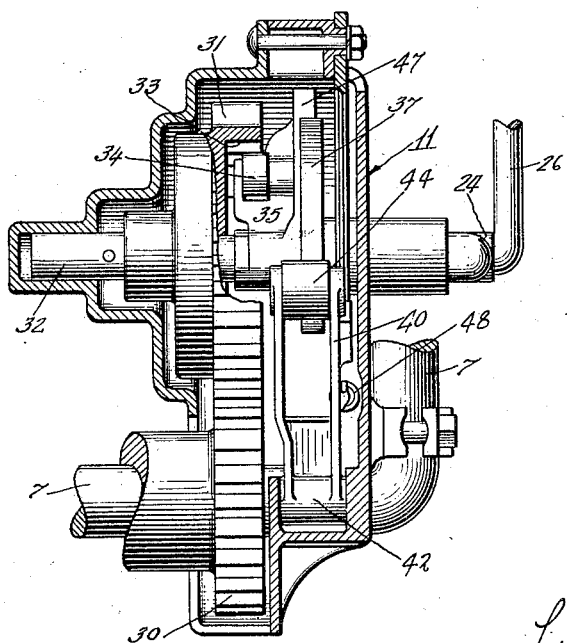
Figure 2 is a section of one of the powerlift mechanisms.

The powerlift includes a gear 30, illustrated in Figure 2, which is journalled on the crank axle 7 and is connected to the hub of the land wheel 9 so that the gear rotates continuously with the land wheel. Meshed with the gear 30 is a gear 31 journalled loosely on a stub shaft 32 which has the crank 24 integral with it. The interior of the gear 31 is provided with a plurality of notches 33, illustrated most clearly in Figure 6. Cooperating with these notches is a roller 34 carried by a dog 35, pivoted at 36 on a disk or plate 37 keyed to the stub shaft 32. The dog 35 is normally biased by a spring 38 having one end bearing on a lug 39 on plate 37 and its other end engaging the dog to cause the roller 34 to engage in one of the notches 33 in rotating gear 31. It will be clear that, if the roller 34 is in engagement with one of the notches 33, the disk 37 is locked to the gear 31 and, as a result, the stub shaft 32 will be rotated with the gear thereby rotating the crank 24.

The dog 35 is held so that the roller 34 is disengaged from notches 33 by locking latches 40 and 41 pivoted to the housing at 42 and 43. These latches carry rollers 44 and 45, respectively, which engage in a notch 46 in the periphery of the disk 37, and, when in said notch, they also engage the projecting end 47 of the dog 35, so as to hold the dog with the roller 34 disengaged from notches 33. The two latches 40 and 41 are connected by a spring 48 for purposes which will be described later.

The latches are provided with projections 49 and 50, respectively, which are engaged with a rolling contact by corresponding projections 51 and 52 carried by a tripping arm 53, having an oblong opening 54 to accommodate the stub shaft and associated parts. The tripping arm 53 is pivoted at 55 and it has integral with it what has heretofore been termed the tripping lever 13.

When the implement is in lowered position, the parts occupy the position illustrated in Figure 3. The projection 51 of the tripping lever 53 engages the projection 49 to positively hold the latch 40 out of contact with the plate 37. The spring 48 is under tension and the latch 41 is held in a position such that the roller 45 is in the notch 46 in plate 37. In this position the roller 45 engages the projecting end 47 of the dog 35 and the clutch is disengaged.

When it is desired to raise the implement, the lever 18 is pulled upwardly which swings the cranked end of the shaft 17 clockwise and moves the link 15 downward longitudinally. This swings the tripping lever 13 clockwise and moves the arm 53 from the position of Figure 3 to that of Figure 4. During this movement the projection 51 moves out of contact with the projection 49 and the projection 52 contacts the projection 50, thereby positively moving the latch 41 from the position of Figure 3 to that of Figure 4. The movement of latch 41 acts through the spring 48 to move the latch 40, and the parts are positioned so that, when the lever 18 has been moved upwardly to a point where its latch is in the upper notch of the locking bar 20, the latch 41 will be completely disengaged from the disk 37, and the latch 40 will have been moved so that its roller 44 just contacts the edge of the disk 37.

When the latch 41 with its roller 45 has been moved out of the notch 46, and out of engagement with the projection 47, the spring 38 biases the dog 35 to cause the roller 34 to engage one of the notches 33 in the rotating gear 31. This locks the disk 37 to the rotating gear 31, so that the disk rotates with the gear and, in turn, the stub shaft with the crank 24 is rotated to raise the implement.

As the disk rotates, the raised portion 57 of the periphery of the disk cams the roller and latch 40 outwardly so as to place a tension on the spring 48. This tension does not move the latch 41 because it is positively held disengaged by the tripping lever not only through the friction of the parts, but also through the fact that the latch 19 of the control lever 18 is locked in the upper notch of the locking bar 20 or contacts the edge of the bar with sufficient friction to prevent any movement of the parts.

The result is that the latch 40 is held against the periphery of the disk 37 by spring 48 with considerable force so that, when the notch 46 comes opposite roller 44, the roller is positively snapped into the notch and into contact with the projection 47, thereby moving the dog 35 and disengaging the roller 34 from the notch 33 with which it has been in engagement. This automatically disengages the clutch.

It will be observed that the tripping lever positively moves the latch 41 out of engagement with the disk 37, and pulls the latch 40 to a position such that a force is automatically exerted by the movement of the mechanism itself to place the latch under tension to positively snap it into locking position to automatically disengage the clutch.

When the implement reaches its raised position, the roller 44 occupies the position illustrated in Fig. 7 in which the clutch is locked in disengaged position and the crank axle 7 is substantially vertical.

Figure 8:
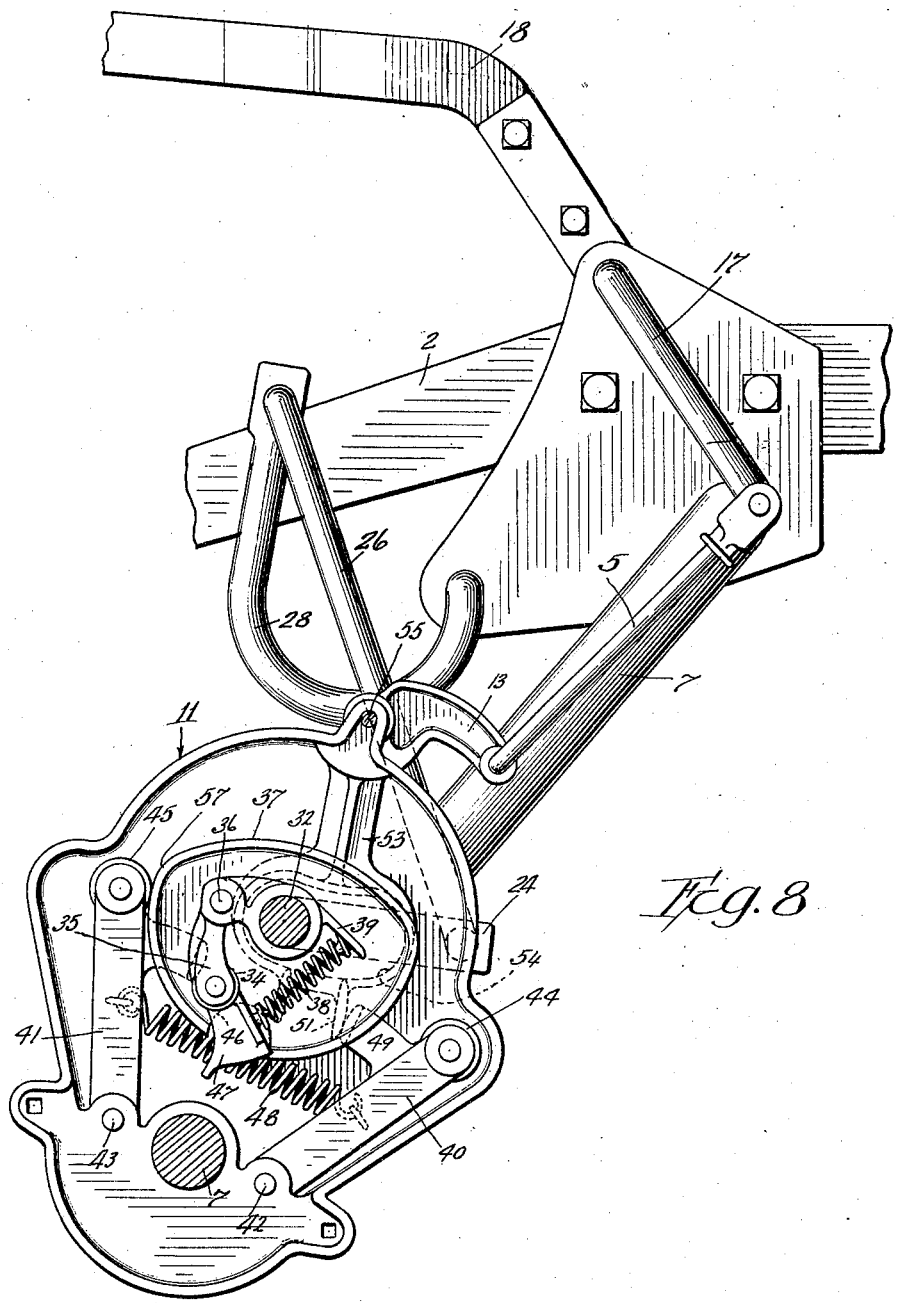
Figure 8 is a side elevation and partial section showing the parts in the position they occupy after the tripping lever has been operated to lower the implement from the position of Figure 7 and after such lowering movement has been started, this figure also serving to show how the locking latches are placed under tension.

When it is desired to lower the implement from the position of Fig. 7, the lever 18 is pushed downwardly which moves the cranked end of shaft 17 in a counter-clockwise direction and pulls upwardly on the link 15. This moves the tripping lever 13 and the arm 53 in a counter-clockwise direction and, through the medium of projections 51 and 49, positively throws the latch 40 and roller 45 out of the notch 46 to the position illustrated in Fig. 8. The latch 40, through spring 48, swings the latch 41 with it, so that the roller 45 is just in contact with the flattened portion of the disk 37. As the disk continues to revolve, it cams the roller 45 as illustrated in Fig. 8 and places a tension on the spring 48 so that roller 45 bears against the periphery of disk 37 with force sufficient to positively snap it into notch 46 when that notch comes opposite the roller. The clutch is disengaged and movement of the mechanism is automatically stopped when the implement reaches a lowered position in the same manner as it is stopped when the implement is raised.

This powerlift has many advantages over other types among which are the following.

It is positive because the control lever is connected through rigid mechanical connections to the tripping mechanism of each powerlift. It is also positive in that, when the control lever is moved, the latches are positively moved through rigid mechanical means. There is no tripping or snapping action, and it is not possible for the latch which has been disengaged to snap back into the notch 46. It is positively held out of engagement. This means that, when the tripping lever is operated, the powerlift can thereafter stop in only one position, namely the position for which it is set.

The operation of the control lever is made easy because its movement does not put any tension on the parts. The tension is applied by movement of the powerlift mechanism. Consequently the tension is placed on the latch regardless of the operator.

It will be understood that the construction shown is for purposes of illustration and that variations may be made without departing form the spirit and scope of the invention as defined by the claims.

I claim:

1. The combination in an implement power-lift mechanism having a definite cycle of movement, of a continuously rotatable element, an intermittently rotatable element, a connecting means normally urged to a position to serve as a connection between said elements but movable to a position to disconnect them, controlling mechanism for said connecting means to hold it in disconnected position, to release it to permit it to move to connecting position, and to automatically actuate it to move it to disconnecting position after the intermittently rotatable element has moved through a predetermined cycle, and actuating means for positively moving the controlling mechanism to release the connecting means to permit it to move to connecting position, said controlling mechanism including means operated by movement of the power-lift mechanism after it has been set into operation for storing energy in a portion of the controlling mechanism for use in automatically moving said controlling mechanism to move the connecting means to disconnected position after the intermittently rotatable element has moved through a predetermined cycle.

2. The combination in an implement power-lift mechanism having a definite cycle of movement, of a continuously rotatable element, an intermittently rotatable element including a cam disk having a notch in its periphery, connecting means normally urged to a position to connect said elements together but movable to a position to disconnect them, said connecting means having a portion projecting into the slot in said disk, a controlling means including a latch mechanism adapted to bear against the periphery of said disk and having portions shaped to enter said notch to engage the connecting means to move it to disconnected position, said disk being shaped so that after the power-shift mechanism has been set into operation it actuates the latch mechanism to store energy in it for use in snapping the latch mechanism into the notch in the disk after the intermittently rotatable element has moved through a predetermined cycle.

3. An implement powerlift mechanism having a continuously rotatable member, an intermittently rotatable member, means for connecting said members together, a latch mechanism for disconnecting said connecting means after the powerlift mechanism has moved through a predetermined cycle, said latch mechanism including two latches, a controlling means serving, when operated, to positively move one of said latches out of operative position and the other into its position for stopping the powerlift mechanism, and means operated by movement of the powerlift mechanism for storing energy in the second latch to cause it to positively snap into its position for disconnecting the connecting means after the powerlift has moved through a predetermined cycle.

4. An implement powerlift mechanism having a continuously rotatable member, an intermittently rotatable disk having a notch in its periphery, a dog mechanism normally biased to engage the continuously rotatable member to connect the disk to said member, a pair of latches for engaging the notch in the disk and for engaging the dog mechanism to disengage the latter from the continuously rotatable member, and operating means for the latches serving to positively move one latch out of the notch in the disk to thereby permit the dog mechanism to connect the disk to the continuously rotatable member and serving to simultaneously move the second latch into a position to automatically enter the notch in the disk to disengage the dog mechanism after the disk has moved through a predetermined cycle, and means operated by movement of the powerlift mechanism for storing energy in the second latch to cause it to snap into the notch when the disk reaches a predetermined position.

5. An implement powerlift mechanism comprising a continuously rotatable member, an intermittently rotatable disk having a notch in its periphery, a dog mechanism normally biased to engage the continuously rotatable member to connect the disk to said member, a pair of latches for engaging the notch in the disk and for engaging the dog mechanism to disengage the latter from the continuously rotatable member, an operating means for the latches serving to positively move one latch out of the notch in the disk to thereby permit the dog mechanism to connect the disk to the continuously rotatable member, said operating means also serving to move the second latch into engagement with the periphery of the disk, the periphery of said disk having a flattened portion with which said second latch contacts, and a spring associated with the second latch, the periphery of said disk being shaped so that as the powerlift mechanism moves the disk, the periphery of the disk moves the second latch so that the spring puts a force on the latch to cause it to snap into the notch when the notch reaches the proper position for such action.

6. An implement powerlift mechanism comprising a continuously rotatable member, an intermittently rotatable disk having a notch in its periphery, a dog mechanism normally biased to engage the continuously rotatable member to connect the disk to said member, a pair of latches for alternately engaging the notch in the disk and for engaging the dog mechanism to disengage the latter from the continuously rotatable member, operating means for the latch serving to positively move one latch out of the notch in the disk and to hold it in removed position to thereby permit the dog mechanism to connect the disk to the continuously rotatable member, said operating means serving also to move the second latch into engagement with the periphery of the disk, a spring connected between the latch members, the periphery of said disk having a flattened portion such that the second latch contacts the periphery without tensioning the spring, the periphery of said disk being shaped so that, as the powerlift mechanism moves, the disk moves the second latch against the tension of the spring and thus puts a force on the latch to cause it to snap into the notch when the notch reaches the proper position for such action.

In testimony whereof, I affix my signature.

JOHN P. SEAHOLM.